Dec. 2, 1969  J. A. A. CLAES  3,481,079
SLIDING CLOSURES
Filed Feb. 19, 1968  4 Sheets-Sheet 1
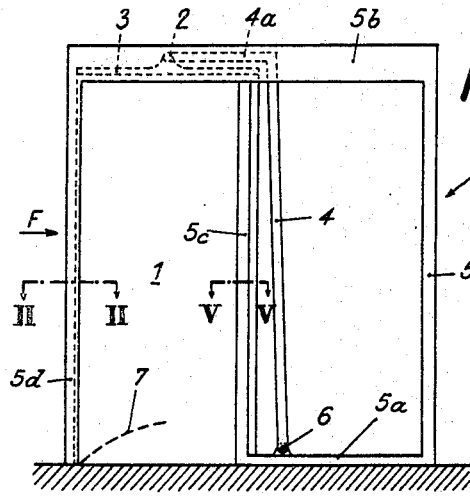
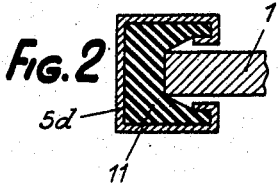
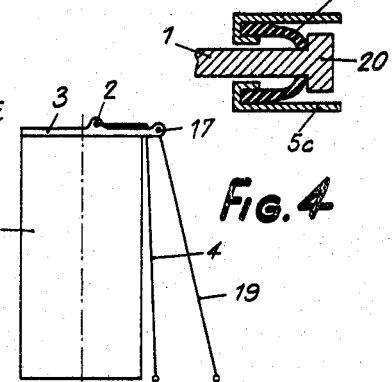
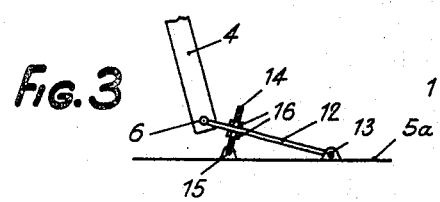
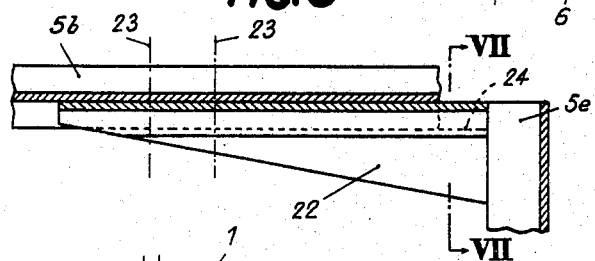
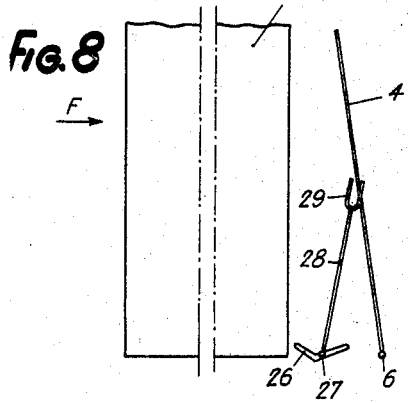
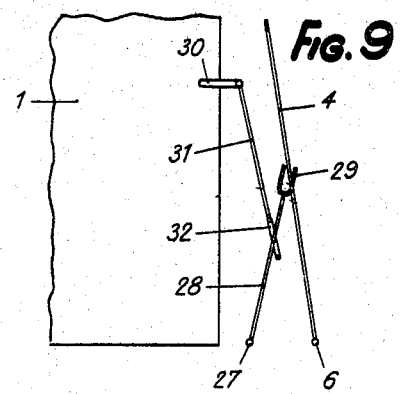
INVENTOR
JEAN ARTHUR AUGUSTE CLAES
By Young & Thompson
ATTYS.

Dec. 2, 1969    J. A. A. CLAES    3,481,079
SLIDING CLOSURES

Filed Feb. 19, 1968    4 Sheets-Sheet 3

INVENTOR
JEAN ARTHUR AUGUSTE CLAES
BY Young + Thompson
ATTYS.

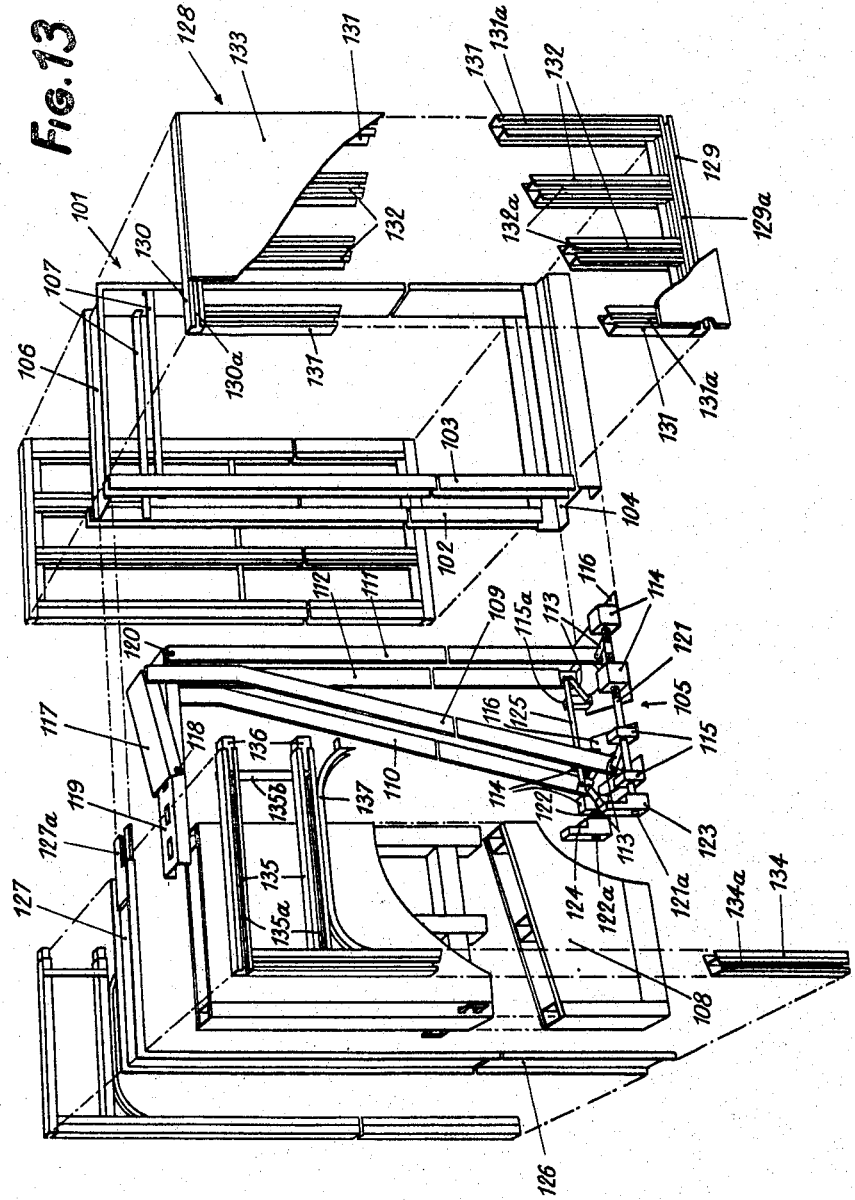

United States Patent Office 3,481,079
Patented Dec. 2, 1969

3,481,079
SLIDING CLOSURES
Jean Arthur Auguste Claes, 32 Rue Ernest Perigois,
La Chatre, Indre 36, France
Filed Feb. 19, 1968, Ser. No. 706,588
Claims priority, application France, Feb. 21, 1967,
95,705
Int. Cl. E05d *15/14, 15/42;* E05f *11/20*
U.S. Cl. 49—216                                11 Claims

---

ABSTRACT OF THE DISCLOSURE

A closure operator moving a panel closure in its plane, comprises at least one arm disposed outside the panel from which the panel is removably suspended by its upper edge, and means acting on the arm to swing the arm in a vertical parallel to the plane of the panel.

---

The present invention relates to sliding closures and aims at providing a novel form of sliding panel which can be easily operated and moved vertically out of engagement with the floor, thus eliminating wear of the carpet or other floor covering and permitting the closure to be moved axially.

An object of the invention is to provide a closure capable of being moved into the wall confines adjacent to the closure-receiving bay or opening when said closure is in its operative position with the result that the closure will not then take up space in the room.

Another object of the invention is to provide a sliding panel or door of the aforesaid type, the panel-driving arm being arranged outwardly of the panel.

A further object of the invention is to provide a sliding panel or door of the aforesaid type permitting a perfect and absolute tightness to be obtained when the panel or door is in closed position so that it can be advantageously utilized as a door for water-tight partition walls or bulkheads and fire-resisting walls or the like.

With these and such other objects in view as will incidentally appear hereafter, the invention comprises the novel construction and combination of parts that will now be more particularly described with reference to the accompanying diagrammatic drawings illustrating the same and forming a part of the present disclosure.

In the drawings:

FIGURE 1 is a diagrammatic view of a device for controlling the motion of a panel or door capable of being slid along its opening plane.

FIGURE 2 is a sectional view on the line II—II of FIG. 1.

FIGURE 3 is a detail view showing means for adjusting the lower hinge of the arm from which the panel is hung or suspended.

FIGURE 4 is a diagrammatic representation of a control device including two carrying arms.

FIGURE 5 is a sectional view on the line V—V in FIG. 1 showing how fluid tightness of the slidable panel is performed.

FIGURE 6 represents a method of positioning the frame uprights.

FIGURE 7 is a sectional view on the line VII—VII in FIG. 6.

FIGURE 8 is a diagrammatic representation of a treadle actuator for the slidable panel.

FIGURE 9 is likewise a diagrammatic representation of a handle actuator for the slidable panel.

FIGURE 13 is a perspective view with parts broken away of the elements of a mechanism for controlling the parallel motion with respect to the opening plane before assembly of said elements, the latter being illustrated in sectional view heightwise so as to avoid the scale of the figure being unduly small and hardly legible.

Figure 10:
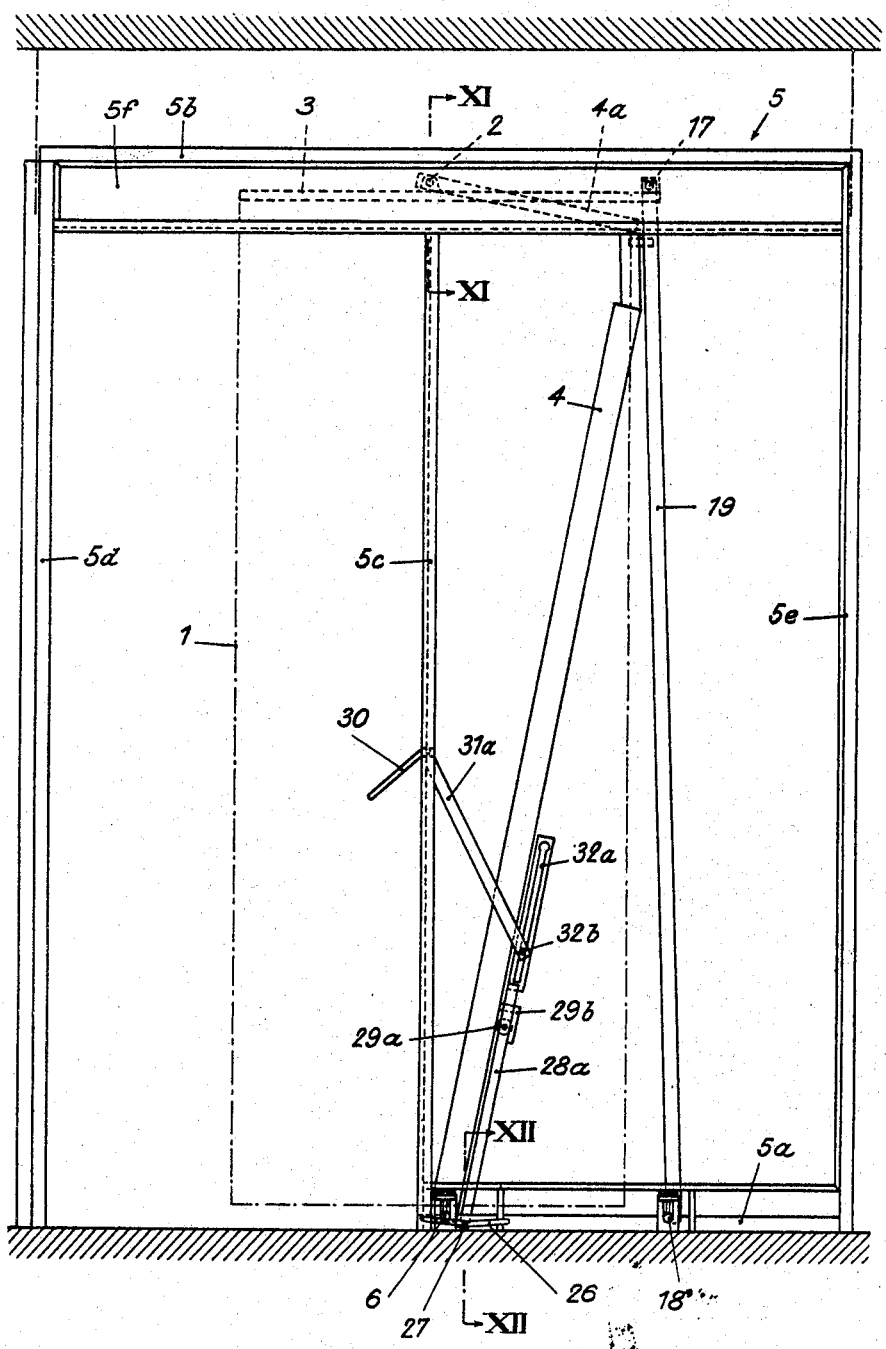
FIGURE 10 is an elevational view of a two-armed mechanism.

In the device shown in FIG. 1, the slidable panel 1 which may be for example made of wood, iron, plastic or any other equivalent material is removably secured to a rigid element 3 connected by an axle 2 with a rockable arm 4 having a cranked portion 4a which connects the securing point 2 with a frame generally designated by 5 and constituted by a lower member 5a upon which is pivotally mounted with the aid of an axle 6 the arm 4 and by an upper member 5b, said members being interconnected at their ends by two uprights 5d, 5e and midway of their length by a standard 5c.

Such an assembly permits the slidable panel 1 to be hung or suspended so that it follows a curvilinear path 7 when a pushing stress is exerted in the direction indicated by the arrow F so as to bring the same from its closed position to its opened position.

The upper member 5b of the frame 5 is constituted by a downwardly opening U-shaped angle member ensuring proper guiding of the panel 1 during its translational motion and interiorly of which is engaged the cranked portion 4a of the arm 4 while the upright 5d is constituted by a U-shaped member opening in the direction of the panel 1 and into which is inserted a seal 11 (see FIG. 2) against which the panel 1 bears when it is engaged in closed position inside the angle member 5d.

The middle standard 5c of the frame 1 is made up of a pair of angle members arranged in twin fashion between which the panel 1 passes during its translational motion.

The pivotal axis 6 of the arm 4 is connected with a variably inclinable link 12 (see FIG 3) which is pivotally connected at a stationary point 13 situated on the lower member 5a of the frame 4, the inclination of this link being selectively variable owing to a screwthreaded rod 14 connected as shown at 15 to the member 5a and associated with nuts 16.

This variable inclination device permits positioning underneath the panel 1 of a carpet or other floor covering or definition under said panel of a passage for the return of air toward a hot air generator.

In order to prevent the panel 1 as it is being moved to opened position, from effecting a rocking movement, there is provided on the rigid element 3 (see FIG. 4) a second hinge point 17 connected with a stationary point 18 situated upon the lower member 5a by means of a rigid rod or a cable 19, the distance between the points 2 and 17 being equal to that comprised between the points 6 and 18. If desired, there may be provided from the hinge point 18 an adjustable inclination device similar to the one shown in FIG. 3.

In this constructional example, the position of the hinge point 2 is a function of the number of arms. Where only one carrying arm is used, the point 2 is preferably situated along the vertical symmetry axis of the panel 1.

Where, on the contrary, two arms are provided, one being a carrying arm, the other one being intended to check the rocking motion of the panel, the pivotal or hinge point 2 is slightly offset toward the hinge point 17 (see FIG. 4) thereby facilitating a constant take up of the clearance, the rod 19 then operating under traction.

Where the panel 1 has a large size, the weight of this panel is then distributed over both arms which thus become carrying arms.

The panel 1 is provided with a side heel 20 (see FIG. 5) which compresses, incidentally to its closing motion, a lipped gasket 21 inserted into the middle standard 5c. A similar heel may be provided on the upper edge of the panel 1 and cooperating with a lipped gasket inserted into the upper angle member 5b.

The uprights 5d and 5e of the frame 5 are provided with brackets 22 which permit positioning of said uprights on the angle members 5a, 5b by means of screws or bolts 23 (see FIG. 6).

Grooves 24 may be provided in the bracket 22 so as to facilitate guiding action, positioning and fixing thereof on the uprights 5a, 5b, while keeping for the latter their frame or encompassing shape. Such angle members furthermore permit the assembly of the several elements of which the frame 5 is made up to be more easily effected without any need to resort to special tools.

Manipulation of the panel 1 may be effected by exerting a pushing stress applied to the panel in the direction indicated by the arrow F (see FIG. 8).

In the constructional form which is diagrammatically represented in FIG. 8, the actuator device for the panel 1 is constituted by a treadle 26 mounted upon an axle 27 and connected with an arm 28 provided at its end with a fork member 29 which causes motion of the arm 4 with a view to opening or closing the panel 1.

In FIG. 9 is diagrammatically represented another form of the actuator for the panel 1, this actuator being fitted with a handle 30 rigidly connected with an arm 31 provided at its end with a fork member 32 adapted, when actuation of the handle 30 takes place, to transmit to the arm 28 having the fork member 29 the necessary stress for shifting the arm 4 for moving the panel 1.

In FIG. 10 is represented an assembly comprising a device similar to the one which is shown in FIG. 4 and including an arm 4 hingedly connected by means of the axle 6 and another arm 19 hingedly connected by means of the axle 18 to the lower member 5a of the frame 5 which also comprises, as in the example represented by FIG. 1, an upper member 5b, a middle standard 5c and a pair of end uprights 5d, 5e.

Figure 11:
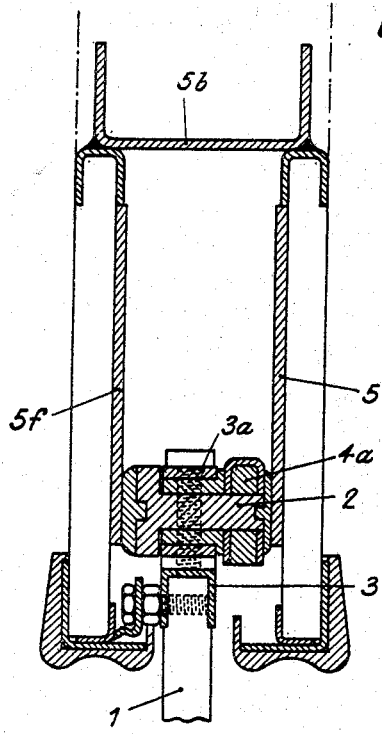
FIGURE 11 is a sectional view on the line XI—XI in FIG. 10 drawn to a larger scale, assuming the panel to occupy its closed position.

The panel 1 is suspended from the axle 2 below the rigid element 3 connected by means of the axle 17 with the arm 19, said rigid element 3 carrying bearings 3a which permit a free pivotal motion of the axle 2 provided on the cranked portion 4a of the arm 4 (see FIG. 11).

The panel 1 is provided with a manipulating gripping or grasping member 30 associated with the treadle 26 to which it is connected by an axle 27 as diagrammatically shown in FIGS. 8 and 9.

The upper member 5b extends vertically in the form of a pair of web plates 5f (see FIG. 11) which extend over the entire width of the frame 5 and permit proper guiding action of the axle 2 when the panel 1 effects its translational motion.

Figure 12:
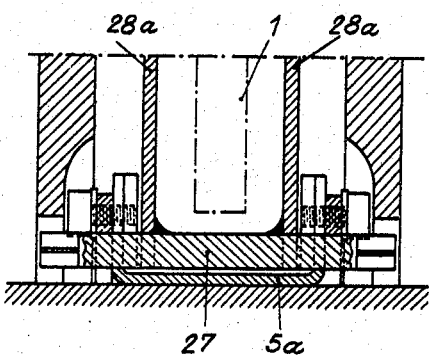
FIGURE 12 is a sectional view on the line XII—XII in FIG. 10 drawn to a larger scale.

The mechanism represented in FIG. 12 comprises a pair of arms 28a, which are hingedly supported by the axle 27 of the treadle 26 and carry a pair of rollers 29a cooperating with a fork member 29b rigid with the arm 4, each arm 28a being extended to form a slide member 32a in which can be moved an axle or roller 32b provided on the arm 31a connected with the handle 30a and supporting the stress exerted upon said handle.

In the showing of FIG. 12, the panel 1 is represented in its semi-opened position. As shown, this panel 1 is arranged over the axle 27 of the treadle 26.

In the constructional form shown by FIG. 13, the frame designated in its entirety by 101 comprises a pair of vertical uprights 102, 103 constituted by U-shaped angle members secured at their lower end to a U-shaped angle member 104 forming a runway for accommodating the mechanism designated generally by 105 and at their upper end to a U-shaped angle member 106, the frame 101 including two guiding staples 107.

The panel 108 is controlled by a pair of arms 109, 110 arranged in twin fashion and a further pair of arms 111, 112 also arranged in twin fashion between which the panel 108 engages when it effects its translational motion. The arms 109, 110 and 111, 112 are hingedly fitted by their lower ends upon links 113 connected in turn with supports 114, 115, 115a secured to small plates 116.

The arms 109, 110 are connected at their upper ends by a U-shaped angle member 117 hingedly fitted owing to axes 118 upon a U-shaped angle member 119 to which the panel 108 is suspended, the upper ends of each of the arms 111, 112 being connected by means of axes 120 with the U-shaped member 119.

The supports 113 are provided with a bore having oppositely directed screwthreaded portions and receive a pair of threaded rods 121, 122 carried by supports 123, 124 whose screwthread is associated with the one of these supports 114 so as to permit, incidentally to an action exerted upon the respective ends 121a, 122a of said rods, the supports 114 to be moved either toward or away from one another, thereby permitting a horizontal adjustment and a heightwise adjustment of the angle member 119 from which the panel 108 is suspended.

The supports 115 rigid with the arm 109 owing to the links 113 are adapted to permit three sliding motions of the rod 121.

The interval between the lower portion of the arms 109, 110 and 111, 112 is achieved by the provision of a link 125 which connects the arms 110, 112.

The rod 122 and the supports 114 which are mutually associated may be arranged on the same side as the rod 121.

The frame 101 is provided with an additional vertical upright 126 connected with a horizontal angle member 127, the latter being connected, as the assembly is performed, by means of a slide member 127a, with the angle member 106, thereby permitting lengthwise adjustment of the frame and dismantling thereof into two elements.

The vertical upright 126 may comprise a seal or gasket similar to the seal 11 (see FIG. 2) against which the panel 1 will come into contact when reaching its closed position.

The frame 101 includes over each one of its faces a protecting panel or cladding designated generally by 128 and formed by a frame constituted by lower angle members 129 and upper angle members 130 connected through the medium of vertical uprights 131, said frame being reinforced by angle members 132 and provided with a fairing 133.

As the frame 101 provided with angle members 126, 127, each protecting panel or cladding 128 is furnished with a vertical upright 134 and horizontal angle members 135, the interval between the latter being determined by a cross-bar 135b and maintained by tenons 136 engaged, during the assembly, into the vertical uprights 102, 103.

The angle members 129, 130 are provided with transverse grooves 129a, 130a and the angle members 131, 132, 134, 135 are provided likewise with longitudinal grooves 131a, 132a, 134a, and with transverse grooves 135a so as to permit insertion and retention in the recesses of these angle members of wall hooking elements arranged on the side of the fairing 133, said grooves extending if desired over one portion only or being distributed at equidistant spacings over these angle members.

The shape of the passage controlled by the panel 108 is determined by an angle member 137 the dismantling of which permits the panel 108 to be laid down and the mechanism 105 to be withdrawn.

Figure 14:
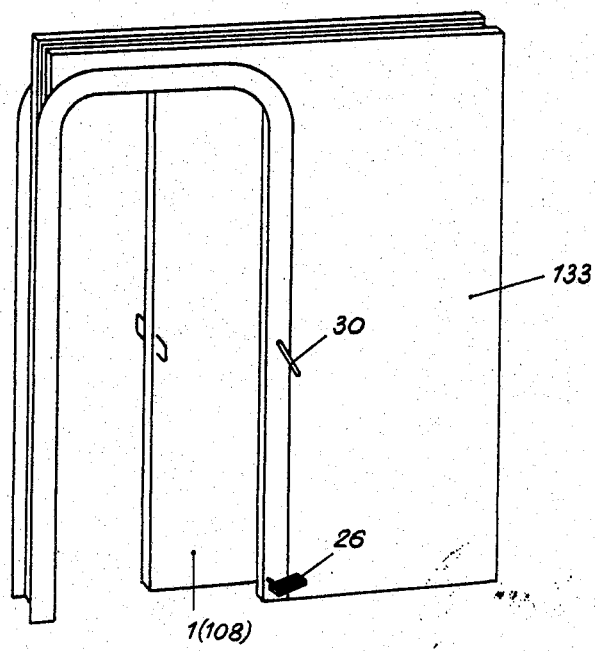
FIGURE 14 is a perspective view representing the slidable panel after the assembly of its several elements.

In FIG. 14 which represents viewed in perspective the withdrawable or eclipsable panel according to the constructional form shown by FIG. 10 or FIG. 13, the panel 1 or 108 is visible after assembly of its several elements, also the treadle 126, the actuating handle 30 and the fairing 133.

Minor constructional details of the device for hanging and controlling a slidable panel or door according to the invention may be varied without departing from the scope of the subjoined claims.

What is claimed is:

1. A closure operator for moving a closure in the form of a panel in its plane, comprising at least one arm disposed outside the panel, means mounting the lower end of the arm for pivotal movement in a vertical plane parallel to the plane of the panel, means removably pivotally securing an upper edge of the panel to an upper end of the arm, and means acting on the arm to swing the arm in said vertical plane whereby the panel follows a curvilinear path between open and closed positions.

2. Apparatus as claimed in claim 1, and a frame for the panel closure operator, said frame comprising a lower horizontal member and an upper horizontal member interconnected adjacent their ends by two uprights, and interconnected intermediate their length by an upright, said arm having its lower end pivotally connected to said lower member.

3. Apparatus as claimed in claim 2, said uprights having brackets by which they are adjustably secured to said upper and lower members.

4. Apparatus as claimed in claim 2, the pivotal interconnection of the lower end of said arm comprising a link pivotally interconnecting the lower end of the arm and said lower frame member, and means for adjustably fixing the inclination of said link in the plane in which said arm pivots.

5. Apparatus as claimed in claim 1, said means acting on the arm comprising at least one lever to convert movement applied to the lever to said vertical swinging movement of the arm.

6. Apparatus as claimed in claim 1, said means acting on the arm including a handle disposed about midway of the height of the panel.

7. Apparatus as claimed in claim 2, said panel having flange means on the vertical edge thereof which is adjacent said intermediate upright when the panel is closed, and at least one gasket carried by said intermediate upright and engaged by said flange means when the panel is closed.

8. Apparatus as claimed in claim 1, said at least one arm comprising a pair of arms disposed outside the panel, one of which is pivotally connected to the panel intermediate the length of the upper edge of the panel and the other of which is pivotally connected to the panel adjacent one end of the upper edge of the panel.

9. Apparatus as claimed in claim 8, and an upper horizontal support member to which the upper edge of the panel is releasably secured and to which said arms are pivotally connected about parallel horizontal axes perpendicular to the plane of the panel.

10. Apparatus as claimed in claim 8, and support members to which the lower ends of said arms are pivotally connected, and oppositely screw-threaded rods on which said support members are oppositely screw-threadedly disposed so that upon rotation of said rods, said support members move the axes about which lower ends of said arms pivot.

11. Apparatus as claimed in claim 2, said upper member being constituted by two elements interconnected by a slide member permitting the frame to be adjusted lengthwise and dismantled into two elements.

References Cited

UNITED STATES PATENTS

| | | | |
|---|---|---|---|
| 485,934 | 11/1892 | Hess | 49—353 X |
| 505,376 | 9/1893 | Whitaker | 49—363 X |
| 1,339,790 | 5/1920 | Salladay | 49—216 |
| 1,800,635 | 4/1931 | Isenberg et al. | 49—266 X |
| 2,702,704 | 2/1955 | Mercier | 48—363 |

FOREIGN PATENTS

| | | |
|---|---|---|
| 898,117 | 6/1944 | France. |
| 894,977 | 4/1962 | Great Britain. |

DAVID J. WILLIAMOWSKY, Primary Examiner

J. K. BELL, Assistant Examiner

U.S. Cl. X.R.

49—263